US006626696B2

(12) United States Patent
Kondo

(10) Patent No.: US 6,626,696 B2
(45) Date of Patent: Sep. 30, 2003

(54) ELECTRIC WIRE HOLDING STRUCTURE FOR CONNECTION BOX

(75) Inventor: Masayuki Kondo, Shizuoka (JP)

(73) Assignee: Yazaki Corporation, Tokyo (JP)

(*) Notice: Subject to any disclaimer, the term of this patent is extended or adjusted under 35 U.S.C. 154(b) by 15 days.

(21) Appl. No.: 09/933,072

(22) Filed: Aug. 21, 2001

(65) Prior Publication Data

US 2002/0025716 A1 Feb. 28, 2002

(51) Int. Cl.[7] ............................................. H01R 13/58
(52) U.S. Cl. ........................ 439/467; 439/466; 439/492
(58) Field of Search ......................... 439/467, 492–499, 439/405, 113, 417

(56) References Cited

U.S. PATENT DOCUMENTS

| 4,225,205 A | * | 9/1980 | Sinclair et al. ............... 339/59 |
| 4,932,873 A | | 6/1990 | La Shier ..................... 439/76 |
| 5,064,380 A | * | 11/1991 | Dale et al. ................... 439/113 |

FOREIGN PATENT DOCUMENTS

| DE | 695 05 593 T2 | 6/1999 |
| EP | 01 47 080 | 3/1985 |
| EP | 0 147 080 A2 | 7/1985 |
| GB | 2 067 365 A | 7/1981 |
| GB | 2 069 254 A | 8/1981 |
| GB | 2 098 812 A | 11/1982 |
| GB | 2 282 494 A | 5/1995 |
| GB | 2 352 051 A | 1/2001 |
| JP | 62-285373 | 12/1987 |

OTHER PUBLICATIONS

Oct. 31, 2002 Office Action from German Patent Office in corresponding application No. 101 40 752.1–34 and pertinent translation.

* cited by examiner

Primary Examiner—Alexander Gilman
(74) Attorney, Agent, or Firm—Armstrong, Westerman & Hattori, LLP

(57) ABSTRACT

Projections are provided in gaps between each wire opening for electric wire main bodies of a flat cable in a connection box to clamp and hold the flat cable. Stronger holding force is easily attained with smaller body size of the connection box for a flat cable. Various flat cables with deferent wire diameter are accepted in the same size connection box. The operation for assembling the connection box and the flat cable is facilitated.

5 Claims, 2 Drawing Sheets

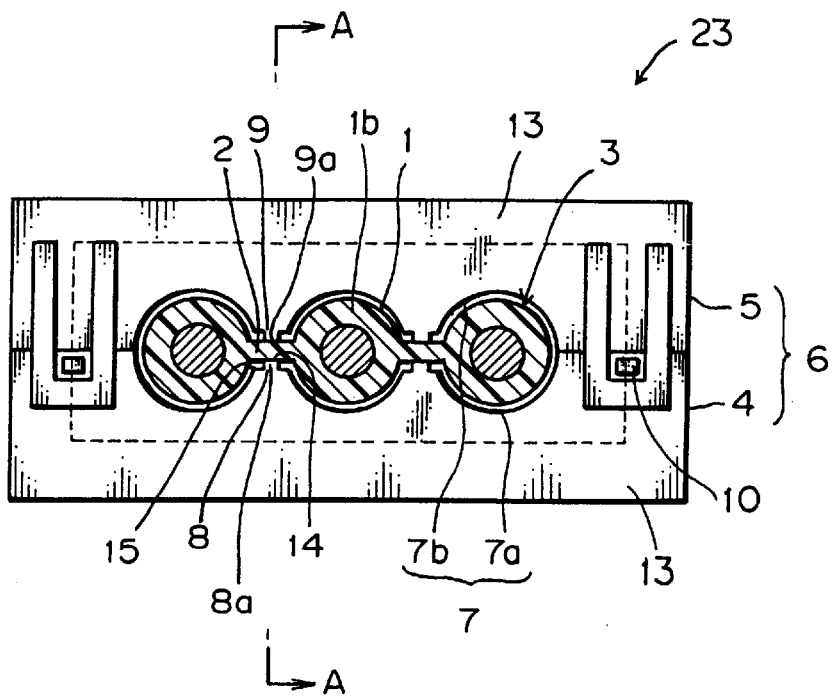
F I G. 1
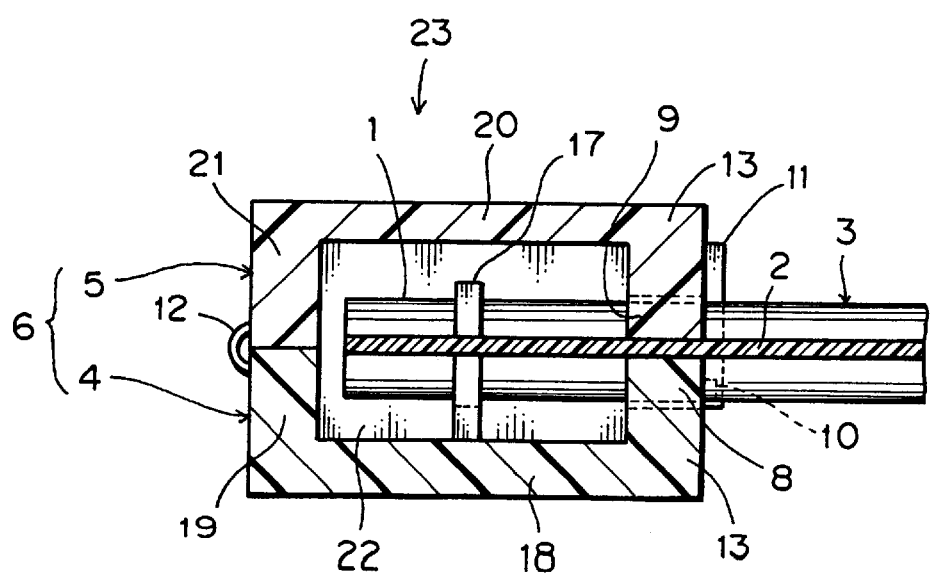
F I G. 2

ELECTRIC WIRE HOLDING STRUCTURE FOR CONNECTION BOX

BACKGROUND OF THE INVENTION

1. Field of the Invention

This invention relates to an electric wire holding structure for a connection box to protect the joint portion of a flat cable and terminals against external tensile force loaded on the flat cable, juxtapositionally combined in one with a plurality of electric wire main bodies and connected to terminals in a connection box body such a joint box body or the like and clamped at the connecting portions of the flat cable by the joint box body.

2. Description of the Related Art

FIG. 5 is showing one embodiment of an electric wire holding structure of a conventional connection box (joint box).

A joint box body 43, made of synthetic resin, includes a base 41, a cover 42 and pressure contact terminals 44 made of a conductive metal inside. Intermediate position along the length of electric wires 26 is connected to the terminal 44 and the electric wire 26 extends out of gaps between the base 41 and the cover 42 and is formed into wave-like shape by three positions of a rib 24 provided on the base 41 for strain-relief, a rib 25 provided on the cover 42 for strain-relief and a wire opening 45 to protect joint portions of electric wires 26 and terminals 44 against external tensile force loaded on the electric wires 26 by cutting off transmitting the tensile force to the joint portion.

A joint box 46 is provided mainly with the joint box body 43 and the pressure contact terminals 44, connecting a plurality of the electric wires 26 reciprocally inside the joint box body 43. The juxtapositionally terminal combined type with the same number of terminals 44 as the joints of the electric wires 26 may be used.

The electric wires 26 is round type insulated electric wire which is round shape cross section conductive wire, covered with insulating resin to have round shape cross section. The pressure contact terminal 44 consists of a blade (not shown) cutting the insulation of the electric wires 26 and a slot (not shown), continuous to the blade, holding and connecting the conductive portion of the electric wires 26. Instead of the pressure contact terminal 44, a laser beam welding terminal or a crimp contact terminal which is crimp-contacted at the conductive portion, removed the insulation of the electric wires 26 at intermediate portion on the length direction, can be used.

The joint box body 43 is formed in thin wall thickness rectangular solid shape and the base 41 and the cover 42 are jointed with thin hinges (not shown) on the side of each edge to be open-close free as an example. The ribs 24 (strain relief) as a part of the base 41 are provided at the both of front and back sides of the pressure contact terminals 44, mounted on almost center of the base 41. The ribs 25 (strain relief) are provided closely at outer side of the ribs 24 on the cover 42. Each ribs 24, 25 extends long along radius direction of the electric wires 26 to form juxtaposed plural electric wires 26 in wavelike shape simultaneously.

The wire openings 45 are provided closely outer side of the ribs 25 on the cover 42 in the both of front end and back end side of the joint box body 43. In this description, front and back are defined along the length of the electric wires 26. The wire openings 45 are to become round shape openings to be combined by each semicircle opening, formed opposite each other on the perpendicular walls of the base 41 and the cover 42 when the cover 42 closed.

After connecting the electric wires 26 to the terminals 44, owing to close the cover 42 to the base 41, the electric wires 26 are pushed down to the bottom surface of the base 41 by the ribs 25 on the cover 42 and are formed in clank shape between the ribs 24 on the base 41 and the wire openings 45. Therefore, very stronger tensile force, loaded on the electric wires 26, enlarges friction force between the electric wires 26 and each ribs 24, 25. Then, electric connection is kept in good condition because the loaded tensile force on the electric wires 26 is caught by the each ribs 24, 25 and transmission of the tensile force to the joint portion of the electric wires 26 and terminals 44 is prevented.

This structure cannot be applied only on the joint box 46 but also on connection boxes, such a pressure contact connector which includes with base portion, cover portion and pressure contact terminals.

In the electric wires holding structure of connection boxes by ordinary skills, forming the electric wires 26 in wavelike shape by ribs 25, 24, projected upwardly and downwardly on inner surface of the joint box body 43 for strain relieves as tension relaxing parts, has issues to require enough rooms inside and bigger size of the joint box 46.

Further, very strong force for closing the cover 42 required to push the electric wires 26 and form the wires in radius direction of the wire with ribs 25 makes assembling of the joint box 46 troublesome. Forming a plurality of electric wires 26 simultaneously in the joint box is more troublesome.

Adjusting the projecting height of ribs 24, 25 is required as lower height rib is for thicker wire and higher height rib is for thinner wire, various kinds of joint box body 43 are necessary for each size of the electric wires 26. It makes a number of kinds on the joint box body 43 increased and manufacturing and administration costs push up.

SUMMARY OF THE INVENTION

This invention has been accomplished to overcome the above drawbacks and an object of this invention is to avoid increasing outer size and inner room size of connection boxes such a joint box or the like and to provide an electric wire holding structure of a connection box, easily assembled as the cover can be easily closed and unnecessary to change the connection box body for each electric wire size.

In order to attain the objects, regarding a connection structure having electric wires inserted through a gap between a base and a cover of a connection box body and terminals connected to the electric wires within said connection box, the connection structure comprising opposed projections for clamping connecting portions between each electric wire main body of a flat cable, which constitutes said electric wires, being provided at each end of wire lead-out side of said base and cover, whereby said connecting portions of said flat cable are fixed by clamping with the projection.

In the above structure, a flat cable by connected plural electric wire main bodies juxtapositionally can be clamped strongly in a connection box body. Therefore, the reliability on electric connection of a flat cable and each terminal is improved, as each projection of the base and the cover holds the tensile force of the flat cable and eliminate the affection of the tensile force to a joint portion of electric wire main bodies and terminals, when a strong external tensile force loaded on the flat cable.

Further, the inner room size of the connection box body can be shrunk and the connection box size can be miniaturized in the length and radius (vertical) direction of the electric wires because conventional ribs for pressing electric wires is not required and forming the electric wires wavelike inside the connection box body is not required. Manufacturability to close the cover, in other words, manufacturability of assembling the connection box is improved because disuse of forming the electric wires with sharp angle (close to 90 degree) and clamping with large deformation at the flat connecting portions of the flat cable as usual makes the force of closing the cover smaller. Even if the diameter of an electric wire main body changed, the pressing operation of the connecting portions is done by common method and the connection box body can be common use, because of pressing the connecting portions for connecting electric wire main bodies by the projections instead of pressing electric wire main bodies. This allows reducing manufacturing cost and administration cost of the connection boxes.

Advantageously, each of said projections is formed between respective juxtaposed openings for electric lead-out wires. In this structure, the flat cable can be pressed uniformly at plural positions along juxtapositional direction of electric wire main bodies with the same interval and this allows stronger and more stable holding force for the flat cable and then connection area of the terminals can be protected reliably against the tensile force on the flat cable.

Advantageously, each of said projections has flat surface at the top end for pressing connecting portions. In this structure, each flat surface at the top end of projections contacts closely the upper and down surfaces of the each connecting portion of the flat cable without gaps between the connecting portions and the top ends. Then, without slipping between the flat cable and the each top ends, pressing the flat cable with constant pressure by each projections along juxtapositional direction of the electric wire main bodies can react on strong tensile force in the whole width of the flat cable when the tensile force loaded on the flat cable.

Advantageously, one of the projections is formed into convex shape at its top end while the other projection is formed into concave shape at its top end. In this structure, the convex section of the upper-side projections deform the thin connecting portions of the flat cable to push the connecting portions into the concave section of the down side projections and the connecting portions fit into the concave sections. Therefore, the friction force between the connecting portions and the projections is increased and then the holding force of the flat cable is increased to react against stronger tensile force on the flat cable.

Advantageously, connection structure wherein said convex sections and said concave sections are formed into V-shape or semicircular shape. In this structure, as the connecting portions of the flat cable are deformed to fit tightly into the concave sections by V-shape convex and concave sections of the top ends of projections, the holding force of the flat cable is increased more and reacts strongly against the tensile force on the flat cable. Furthermore, clamping the connecting portions of the flat cable with semicircular shape concave and convex sections prevents to damage the connecting portions and then extends the life of the flat cable.

The above and other objects, features and advantages of this invention will become apparent from the following description and the appended claims, taken in conjunction with the accompanying drawings.

BRIEF DESCRIPTION OF THE DRAWINGS

FIG. 1 is a front view of a connection box, showing one embodiment of an electric wire holding structure of a connection box according to this invention;

FIG. 2 is a (longitudinally) sectional view taken along the line A—A of FIG. 1;

DESCRIPTION OF THE PREFERRED EMBODIMENT

Figure 3:
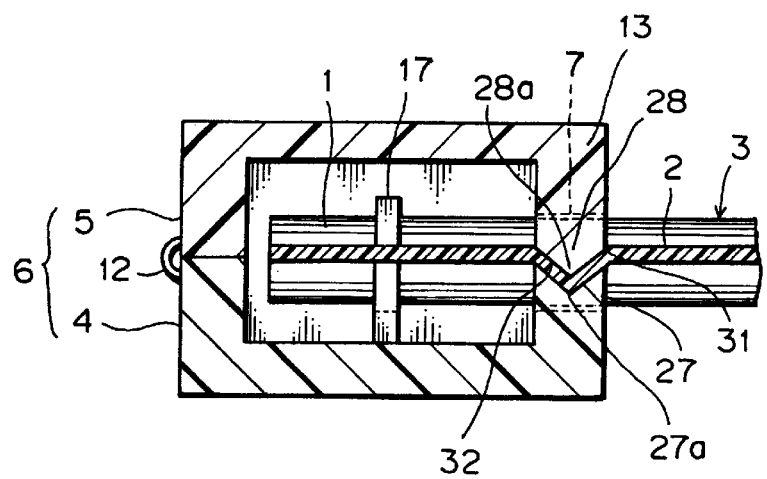
FIG. 3 is a longitudinally sectional view of a connection box, showing other embodiment of an electric wire holding structure of a connection box according to this invention.

One embodiment of this invention will now be described with reference to the attached drawings.

FIG. 1 (the front view) and FIG. 2 (the sectional view taken along the line A—A of FIG. 1) is showing one embodiment of an electric wire holding structure of a connection box according to this invention.

In FIG. 1, connecting portions 2, made of thin insulating resin material, joint a plurality of electric wire main bodies 1 lateral juxtapositionally to make a flat cable 3 (flat circuit body). Each connecting portion 2 of the flat cable 3 is pressed in clamping direction and held at wire openings 7 on the front end of a joint box body (connection box body) 6 by each projection 8, 9 of a base 4 and cover 5.

A couple of right and left locking projections 10 of the base 4 and flexible engaging flaps 11 of the cover 5 lock the joint box body 6 like an enclosure. As shown in FIG. 2, the rear portions of the joint box body 6 are connected to be open-close free with thin thick hinges 12, as parts of the joint box body 6. In this embodiment of the invention, the flat cable 3 is inserted through only the front end side of the joint box body 6 and the front edge of the flat cable 3 is placed near the inside rear end of the joint box body 6.

As shown in FIG. 1, the wire openings 7 are given as round shape by combining, in vertical direction, same inner radius semicircular openings 7a and 7b, formed on the base 4 and the cover 5. Gaps 14 are formed horizontally connecting juxtaposed plural wire openings 7, three openings in this embodiment, in the line made by the circle centers of the wire openings 7. Rectangular shape projections 8, 9 are formed opposed vertically to each other in the gaps 14 for pressing the flat cable. The projections 8, 9 which top ends have horizontal flat surfaces 8a and 9a are continued through short steps 15 horizontally to inner radius surfaces of semicircular openings 7a and 7b.

The projections 8, 9, formed narrow and sharp by the steps 15 in the electric wire radius direction, catch the thin flat connecting portions 2 of the flat cable 3 securely and press the connecting portions 2 with very high pressure force. As shown in FIG. 2, the projections 8, 9 are formed wide width, herein as the same width of the wall thickness of a front wall portion 13 along the length of the electric wire. It is possible to use partial area of the inner surface of the semicircular openings 7a and 7b as the lateral walls of the projections 8, 9, eliminating the steps 15.

The flat cable 3 is inserted into the round shape wire opening 7 with small clearance for each round sectional electric wire main body 1 and each electric non-conductive flat connecting portion 2 of the flat cable 3 is placed in each horizontal gap 14 connecting respective wire openings 7. The connecting portions 2 are clamped and held by opposed up and down projections 8, 9 as the upward projections 8 of the base 4 push up the bottom surface of the connecting portions 2 and the downward projections 9 of the cover 5 push down the upper surface of the connecting portions 2. Therefore, when loaded strong tensile force on the flat cable 3, friction force between upper and down projections 8, 9 and the connecting portions 2 of the flat cable 3 can hold the tensile force and avoid transmitting the force to joint portions of electric wire main body 1 and terminals 17 (FIG. 2) and then the joint portions are protected stably eliminating affection of tensile force on the flat cable 3.

Clamping the connecting portions 2, jointing the electric wire main body 1, by the projections 8, 9 instead of the electric wire main body 1 which has conductive body 1a of core wire and round shape synthetic resin insulation coating 1b on the conductive body 1a, allows to hold reliably the flat cable 3 regardless of external diameter size of the electric wire main body 1. The wire pitch of the electric wire main bodies 1 is required to be placed in the wire openings 7 as the electric wire extending out of a model joint box body 6. Adjusting the inner radius size of wire openings 7 to receive the maximum wire radius allows one model of joint box body 6 may be used for a various diameter size of electric wire main bodies 1.

As shown in FIG. 2, the electric wire main bodies 1 are connected to the pressure contact terminals 17 in almost middle of the joint box body 6. Each electric wire main body 1 or some electric wire main bodies 1 required to be connected to each other are connected to each pressure contact terminal 17 which are combined juxtapositionally on a conductive board (not shown). Then, for example, electric current supplied on one electric wire main body 1 can be supplied on the other electric wire main body 1. Placing the center line height of the electric wire main body 1 on the boundary line of the base 4 and the cover 5 in connecting condition of the wire and the terminals 17 is preferable to hold the electric wire main bodies 1 without bending.

As same as conventional structure, the base 4 consists of a bottom wall 18, a front wall 13, a rear wall 19 and two lateral walls and the cover 5 consists of a upper wall 20, a front wall 13, a rear wall 21 and two lateral walls. At least, the terminals 17 and the terminal end of the flat cable 3 are placed in the rectangular room 22 formed inside by closing the base 4 and the cover 5. A joint box (connection box) 23 consists of the terminals 17 and the joint box body 6, provided with the base 4 and the cover 5.

Figure 5:
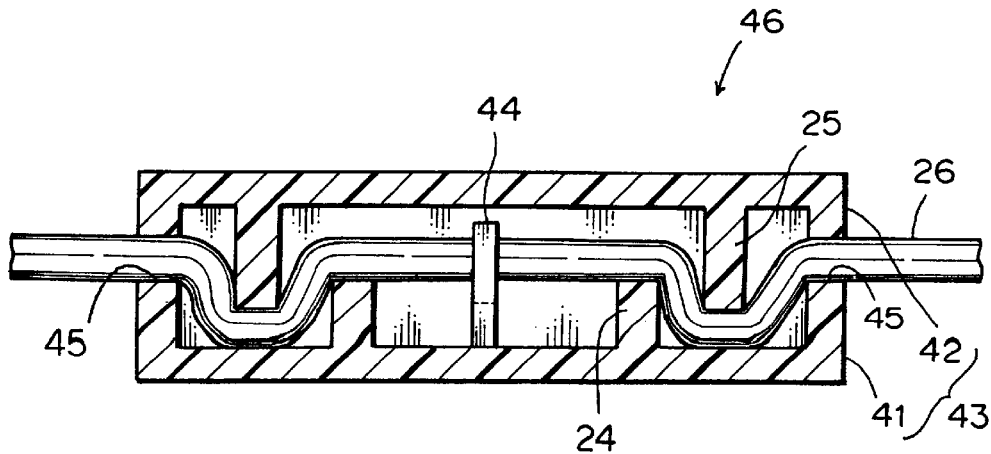
FIG. 5 is a longitudinally sectional view of a connection box, showing one embodiment of an electric wire holding structure of a conventional connection box.

The joint box body 6, consisting of the base 4 and the cover 5, is formed shorter in front-rear direction than the conventional joint box body corresponding to the required length to form the electric wire main body 1 wave-likely with plural ribs 24, 25 (FIG. 5). Furthermore, unnecessity of upper and down ribs 24, 25 and bending the electric wire main body 1 wave-like vertically can make the height of the joint box body 6 smaller.

Further, as locking projections 10 of the base 4 and flexible engaging flaps 11 of the cover 5 lock the base 4 and the cover 5 with tight fitting and clamp the flat cable 3 at the front wall 13 of the joint box body 6, the clamping force of the flat cable 3 is kept strongly for a long while and then the joint portion of the electric wire main body 1 and terminals 17 is protected reliably for tensile force on the flat cable 3.

Figure 4:
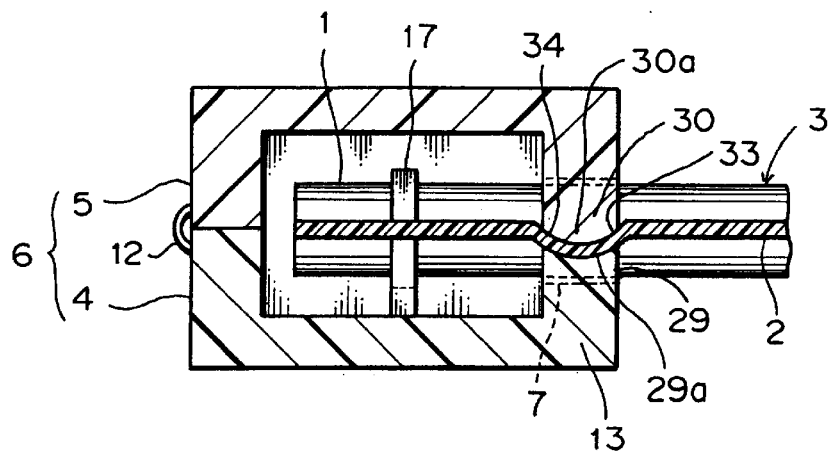
FIG. 4 is a longitudinally sectional view of a connection box, showing more other embodiment of an electric wire holding structure of a connection box according to this invention.

FIG. 3 and FIG. 4 are showing other embodiments of an electric wire holding structure of connection box according to this invention. Compared with above embodiment by FIG. 1 and FIG. 2, the top ends of the projections 27, 28 (FIG. 3) and 29, 30 (FIG. 4) pressing the connecting portions 2 of the flat cable 3 are formed in V-shape or semicircular shape. As the other structure of these embodiments is the same as the structure shown in FIG. 2, detailed description on the other structure of these embodiments is omitted herein.

Regarding the structure shown in FIG. 3, a projection 28 of the cover 5 is formed downwardly in convex V-shape and a projection 27 of the base 4 is formed in concave V-shape. A relatively sharp convex V-shape top (convex section) 28a of the upper projection 28 and a concave V-shape top (concave section) 27a of the downside projection 27 have respectively a front slant wall 31 and a rear slant wall 32 symmetrically on front and rear portions in the length direction of the electric wires. Each projection 27, 28 is placed between each wire opening 7 as same as FIG. 1. The front side width of the projection 27, 28 between each wire opening 7 is narrow, but the width of the projection 27, 28 along the length of electric wires is as same as wall thickness of the front wall 13 as shown in FIG. 3 and is relatively wide to form V-shape slant walls 32, 32 with enough length.

Shutting the cover 5, the thin plate shape connecting portions 2, made of synthetic resin, are clamped with pressure and deformed V-shape between the convex V-shape top 28a of the upper projection 28 and the concave V-shape top 27a of the downside projection 27. Therefore, the counter force to the tensile force on the electric wire main body 1 is remarkably increased and the joint portion of the electric wire main body 1 and the terminals 17 is protected more reliably not to be affected by the tensile force.

Regarding the FIG. 4 structure, a projection 30 of the cover 5 is formed downwardly in convex semicircular shape and a projection 29 of the base 4 is formed in concave semicircular shape. The upper projection 30 has a relatively small curved convex semicircular shape top (convex section) 30a and the downside projection 29 has a concave semicircular shape top (concave section) 29a. In this embodiment, the convex semicircular shape top 30a and the concave semicircular shape top 29a have respectively a front curved wall 33 and a rear curved wall 34 symmetrically on front and rear portions in the length direction of the electric wires. Each projection 29, 30 is placed between each wire opening 7 as same as FIG. 1. The front side width of the projection 29, 30 between each wire opening 7 is narrow, but the width of the projection 29, 30 along the length of wire is as same as wall thickness of the front wall 13 as shown in FIG. 4 and relatively wide to form semicircular shape curved walls 33, 34 with enough length.

Shutting the cover 5, the thin plate shape connecting portions 2, made of synthetic resin, are clamped with pressure and deformed semicircular shape between the convex semicircular shape tops 30a of the upper projections 30 and the semicircular shape curved walls 33, 34 of the downside projections 29. Therefore, the counter force to the tensile force on the electric wire main body 1 is remarkably increased and the joint portion of the electric wire main bodies 1 and the terminals 17 is protected more reliably not to be affected by the tensile force.

A convex trapezoid-like shape top and a concave trapezoid-like shape top instead of the convex V-shape top and the concave V-shape top of the projection 28, 27 in FIG. 3 is effected. Further, a slope curved shape instead of the complete arc shape as the convex semicircular shape top and the concave semicircular shape top of the projection 30, 29 in FIG. 4 is effected. In short, a hooking part in cross direction for the flat cable is accepted. Furthermore, providing projections 28 with convex V-shape top on the base 4 and projections 27 with concave V-shape top on the cover 5 is effected. Providing projections 30 with convex semicircular shape top on the base 4 and projections 29 with concave semicircular shape top on the cover 5 is also effected.

Advantageously, although the front wall of the joint box body 6 may hold the flat cable 3 in each of above embodiments, inserting the flat cable 3 through the right and left end walls of the joint box body 6, the similar projections, such as projections 8, 9, 27, 28, 29, 30 as mentioned above, provided on said right and left end walls, can hold the flat cable 3 on two positions along the length of the flat cable 3 at same time.

Preferably, the terminal 17 is effected by not only pressure contact type but also crimp type or welding type. As electric wire joint portions of pressure contact terminals are easily disjointed by tensile force on the cable, above mentioned structure is especially effective for pressure contact type terminals. Opening and shutting the cover 5 and the base 4 without hinges 12 can be used and such structure requires at least two locking projections 10 and flexible engaging flaps 11 (FIG. 1) as locking means on the front and rear walls or on the right and left walls of the joint box body 6.

Preferably, the flat cable (flat circuit body) is made of not only the round type electric wire main body 1 but also a flat circuit wire, a printed wire or the like (not shown).

Advantageously, above mentioned structure can be used not only for the joint box body 6 but also for a base and a cover of a pressure contact connector (not shown) as a kind of a connection box or for flat wire (flat wire harness) holding in an electric connection box (not shown).

What is claimed is:

1. In a connection structure having electric wires inserted through a gap between a base and a cover of a connection box body and terminals connected to the electric wires within said connection box, the connection structure comprising opposed projections for clamping connecting portions between each electric wire main body of a flat cable, which constitutes said electric wires, being provided at each end of wire lead-out side of said base and cover, whereby said connecting portions of said flat cable are fixed by clamping with the projection, wherein each of said opposed projections contact only a portion in a direction perpendicular to a longitudinal axis of said flat cable between each electric wire main body wherein said projections have non-linear clamping surfaces.

2. The connection structure according to claim 1, wherein each of said projections is formed between respective juxtaposed openings for electric lead-out wires.

3. The connection structure according to claim 1 or 2, wherein each of said projections has flat surface at its top end for pressing connecting portions.

4. The connection structure according to claim 1 or 2, wherein one of said projections is formed into convex shape at its top end while the other projection is formed into concave shape at the top end.

5. The connection structure according to claim 4, wherein said convex sections and said concave sections are formed into V-shape or semicircular shape.

* * * * *

UNITED STATES PATENT AND TRADEMARK OFFICE
CERTIFICATE OF CORRECTION

PATENT NO.     : 6,626,696 B2  Page 1 of 1
DATED          : September 30, 2003
INVENTOR(S)    : Kondo, Masayuki It is certified that error appears in the above-identified patent and that said Letters Patent is hereby corrected as shown below:

<u>Title page,</u>
Add item [30] as follows:
-- [30] Foreign Application Priority Data
     August 22, 2000 (JP)      2000-251142 --.

Signed and Sealed this

Ninth Day of March, 2004

JON W. DUDAS
*Acting Director of the United States Patent and Trademark Office*